United States Patent
Leng

(10) Patent No.: US 11,026,505 B2
(45) Date of Patent: Jun. 8, 2021

(54) FOLDING TABLE

(71) Applicant: NEW-TEC INTEGRATION (XIAMEN) CO., LTD, Xiamen, Fujian (CN)

(72) Inventor: Luhao Leng, Fujian (CN)

(73) Assignee: NEW-TEC INTEGRATION (XIAMEN) CO., LTD., Fujian (CN)

( * ) Notice: Subject to any disclaimer, the term of this patent is extended or adjusted under 35 U.S.C. 154(b) by 0 days.

(21) Appl. No.: 16/397,129

(22) Filed: Apr. 29, 2019

(65) Prior Publication Data
US 2020/0260863 A1    Aug. 20, 2020

(30) Foreign Application Priority Data

Feb. 15, 2019  (CN) .......................... 201910115646.7

(51) Int. Cl.
| | |
|---|---|
| *A47B 13/08* | (2006.01) |
| *A47B 3/087* | (2006.01) |
| *B29C 65/00* | (2006.01) |
| *B29C 65/56* | (2006.01) |
| *B29L 31/44* | (2006.01) |
| *B29K 705/00* | (2006.01) |

(52) U.S. Cl.
CPC ............ *A47B 13/083* (2013.01); *A47B 3/087* (2013.01); *B29C 65/562* (2013.01); *B29C 66/742* (2013.01); *B29K 2705/00* (2013.01); *B29L 2031/448* (2013.01)

(58) Field of Classification Search
CPC ................ A47B 13/083; A47B 13/003; A47B 2013/085; B29C 65/562; B29C 2031/448
See application file for complete search history.

(56) References Cited

U.S. PATENT DOCUMENTS

| | | | | |
|---|---|---|---|---|
| 1,979,309 | A | | 11/1934 | Beiger |
| 2,739,640 | A | | 3/1956 | Brinker et al. |
| 2,846,283 | A | * | 8/1958 | Pasewalk ............. A47B 13/083 52/782.22 |
| 3,115,108 | A | * | 12/1963 | Craddock ............ A47B 13/083 108/155 |
| 3,439,634 | A | * | 4/1969 | Bender ................. A63D 15/00 108/27 |

(Continued)

FOREIGN PATENT DOCUMENTS

| | | |
|---|---|---|
| CN | 2517302 Y | 10/2002 |
| CN | 2829461 Y | 10/2006 |

(Continued)

OTHER PUBLICATIONS

Machine Translation of CN 2829461 Y (Year: 2020).*

(Continued)

*Primary Examiner* — Daniel J Rohrhoff
(74) *Attorney, Agent, or Firm* — Perkins Coie LLP; Kenneth H. Ohriner

(57) ABSTRACT

A composite table top including a top plate having an outer and an inner surface, a bottom plate comprising a plurality of projections, each of the plurality of projections having a top defining a top surface. The composite table top has at least a pair of reinforcement inserts disposed at two opposite edges of the bottom plate. The sum of the top surfaces of the plurality of projections is 30%-70% of the upper surface of the bottom plate.

19 Claims, 6 Drawing Sheets

(56) References Cited

U.S. PATENT DOCUMENTS

| | | |
|---|---|---|
| 3,676,279 A | 7/1972 | Beaver |
| 5,271,338 A | 12/1993 | Bonham et al. |
| 5,303,824 A | 4/1994 | Kohn |
| 5,335,605 A | 8/1994 | Drabczyk |
| 5,357,872 A | 10/1994 | Wilmore |
| 5,497,597 A | 3/1996 | Elzenbeck |
| 5,606,755 A | 3/1997 | Romein |
| 5,694,865 A | 12/1997 | Raab |
| 5,732,637 A | 3/1998 | Raab |
| 5,752,091 A | 5/1998 | Kai et al. |
| 5,835,661 A | 11/1998 | Tai et al. |
| 5,868,081 A | 2/1999 | Raab |
| 5,947,037 A * | 9/1999 | Hornberger .......... A47B 13/083 108/115 |
| 6,058,853 A | 5/2000 | Pinch |
| 6,058,854 A | 5/2000 | Tarnay et al. |
| 6,371,034 B1 | 4/2002 | Simpson et al. |
| 6,666,152 B2 | 12/2003 | Tsai |
| 6,752,091 B2 | 6/2004 | Glover et al. |
| 6,817,662 B2 | 11/2004 | Winter et al. |
| 7,140,308 B2 | 11/2006 | Tsai |
| 7,475,643 B2 | 1/2009 | Haney et al. |
| 7,735,915 B2 | 6/2010 | Nye et al. |
| D668,483 S | 10/2012 | Bennett |
| 8,387,544 B1 | 3/2013 | Lee |
| 9,504,314 B2 | 11/2016 | Leng et al. |
| 9,808,081 B2 * | 11/2017 | Leng .................... A47B 13/083 |
| 9,867,458 B2 * | 1/2018 | Leng .................... A47B 13/083 |
| 10,092,091 B1 * | 10/2018 | Wang .................... A47B 13/083 |
| 10,206,497 B2 | 2/2019 | Leng |
| 2003/0183135 A1 | 10/2003 | Tsai |
| 2003/0200904 A1 | 10/2003 | Strong |
| 2003/0213414 A1 | 11/2003 | Strong |
| 2003/0213416 A1 | 11/2003 | Strong et al. |
| 2004/0187744 A1 | 9/2004 | Wang |
| 2005/0274306 A1 | 12/2005 | Strong |
| 2005/0284562 A1 * | 12/2005 | Frantz ................. B29C 66/5474 156/196 |
| 2008/0092788 A1 | 4/2008 | Leng |
| 2008/0098936 A1 | 5/2008 | Strong |
| 2008/0264307 A1 | 10/2008 | Vannimwegen et al. |
| 2008/0265307 A1 | 10/2008 | Lee |
| 2009/0324872 A1 * | 12/2009 | Leng .................... A47B 13/08 428/73 |
| 2010/0043681 A1 | 2/2010 | Leng |
| 2010/0112265 A1 | 5/2010 | Leng |
| 2011/0174197 A1 | 7/2011 | Seger |
| 2011/0203493 A1 | 8/2011 | Ashby et al. |
| 2013/0025508 A1 | 1/2013 | Leng |
| 2014/0037910 A1 * | 2/2014 | Leng .................... A47B 13/083 428/172 |
| 2016/0051049 A1 * | 2/2016 | Peery .................... A47B 87/02 108/91 |
| 2018/0064242 A1 * | 3/2018 | Tsai .................. B29C 45/14598 |
| 2019/0021484 A1 * | 1/2019 | Leng .................... A47B 96/205 |

FOREIGN PATENT DOCUMENTS

| | | |
|---|---|---|
| CN | 201299266 Y | 9/2009 |
| CN | 202222701 U | 5/2012 |
| CN | 103239011 A | 8/2013 |
| CN | 103284471 A | 9/2013 |
| CN | 205093820 U | 3/2016 |
| CN | 207657291 U | 7/2018 |
| JP | 2982712 B2 | 11/1999 |

OTHER PUBLICATIONS

IP Office China PRC, International Search Report for PCT/CN2016/098798, dated Oct. 28, 2016, 4 pgs.
U.S. Appl. No. 15/760,603, Travis M. Figg, Pending.
U.S. Appl. No. 29/687,475, Caron D. Veynar, Pending.
U.S. Appl. No. 29/687,480, Caron D. Veynar, Pending.
CNIPA, "International Search Report and Written Opinion", for PCT/CN2019/101382, dated Nov. 19, 2019, with English translation, 14 pgs.

* cited by examiner

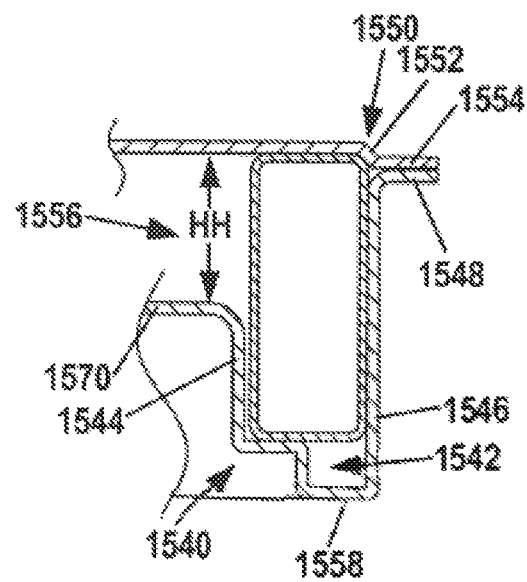
FIG. 6
FIG. 7
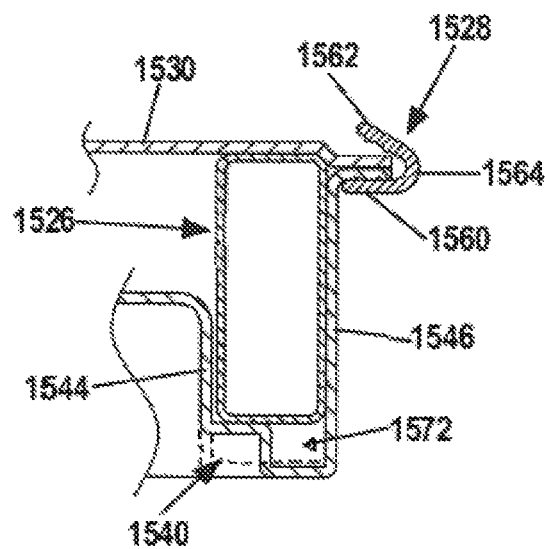
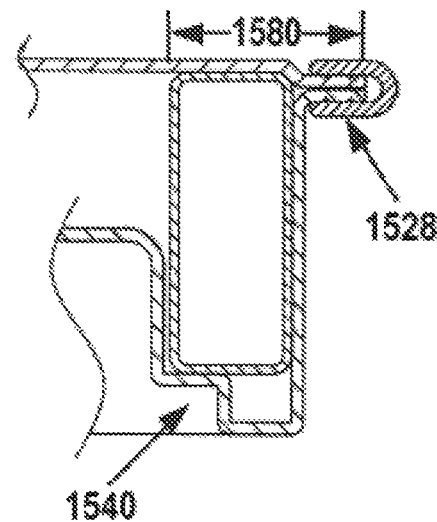
FIG. 8
FIG. 9

FOLDING TABLE

CROSS-REFERENCE TO RELATED APPLICATION(S)

This application claims priority to Chinese invention patent application number 201910115646.7, filed Feb. 15, 2019, which is incorporated herein by reference.

TECHNICAL FIELD

The present invention relates to a table, and to a composite table top.

BACKGROUND

The table is one of the most ubiquitous furniture pieces. The prior art table top panel is traditionally made of wood. The use of wood has disadvantages: firstly, consumption of large amount of wood is not environmentally friendly; secondly, wood needs constant maintenance and thirdly, wood may not be used in some applications. Wood substitutes such as fiberboard or flake board may also share similar defects.

To meet the needs of a modern household, a table top panel needs to be tough, durable, lightweight and appealing. As consumers look for more environment friendly alternatives, there are more and more examples of table top panels made of synthetic materials.

There is a need for an improved table top made of a synthetic material with better applicability, low maintenance cost and better mechanical properties. There is also a need for improved aluminum folding tables and methods of manufacture.

SUMMARY OF THE INVENTION

In a first aspect, a table includes a bottom plate having a bottom plate channel and an outer wall. A bottom plate lip is joined perpendicularly to the outer wall. A top plate has a top plate lip overlying and parallel to the bottom plate lip. A lower end of a frame is positioned in the bottom plate channel and an upper end of the frame is in contact with the top plate. A ductile edge piece has a first arm joined to a second arm via a radius, with the ductile edge piece clamping the top plate lip and the bottom plate lip together. The ductile edge piece may extend entirely around a perimeter of the top of the table.

Optionally, the frame is a rectangular metal tube, which may also extend entirely around a perimeter of the top of the table. The top plate lip may be joined to the top plate via a joggle having an angle section, so that a top surface of the edge piece is co-planer with the top plate. One or more sections of the bottom plate channel may have a step with the frame on the step.

BRIEF DESCRIPTION OF THE DRAWINGS

In the drawings, the same element number indicates the same element in each of the views. The drawings are provided by way of example and are not intended at a limitation on the invention.

FIG. 6 is a section view of the perimeter of the table shown in FIGS. 1-5 showing steps of assembly.

FIG. 7 is a section view of the edge piece shown in FIGS. 1-5.

FIG. 8 is a section view of the edge piece of FIG. 7 in an intermediate assembly step.

FIG. 9 is a section view of the edge piece of FIG. 7 fully assembled to complete the table of FIGS. 1-5.

DETAILED DESCRIPTION

Figure 1:
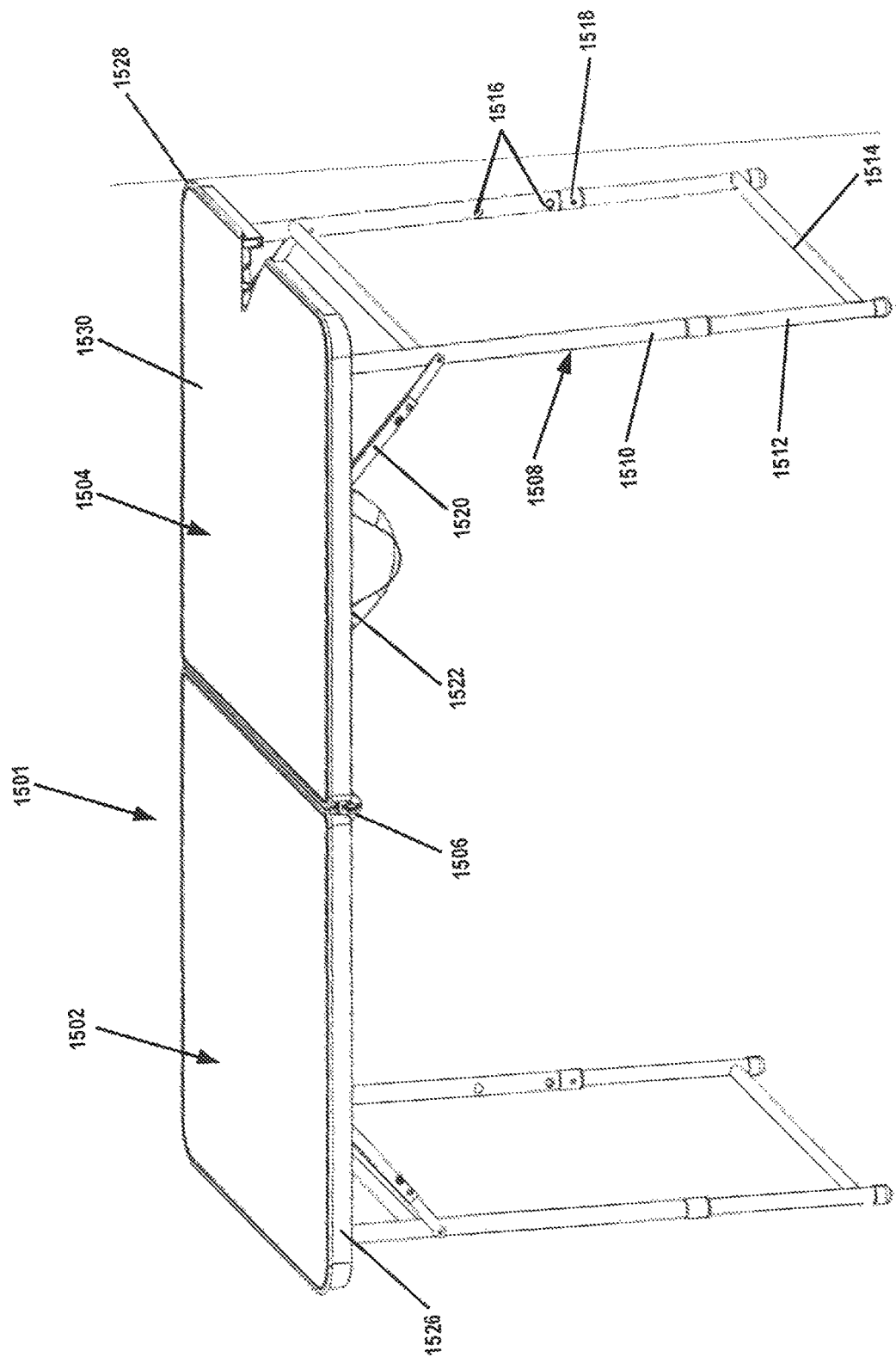
FIG. 1 is a top perspective view of a folding table.
Figure 2:
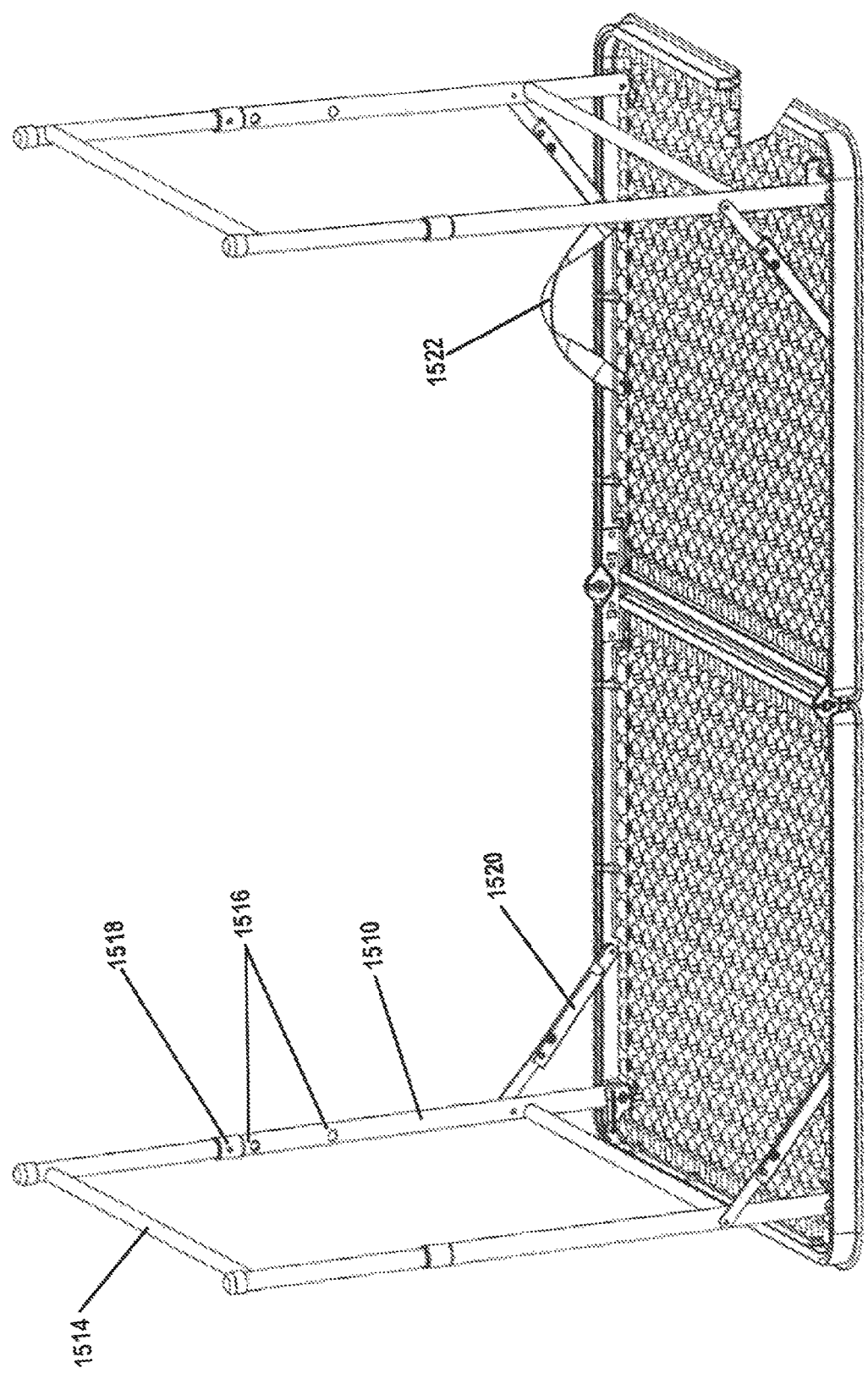
FIG. 2 is a bottom perspective view of the table shown in FIG. 1.

FIGS. 1-9 show a table 1501 with folding legs, that may be made of metal components, such as aluminum. As shown in FIGS. 1-2, the table 1501 may have a first section 1502 attached to a second section 1504 via hinges 1506, to allow the table 1501 to fold in half. A folding leg assembly 1508 is attached to the outer end of each section 1502 and 1504. Specifically, as shown in FIGS. 1-2, each folding leg assembly 1508 includes a pair of leg tubes 1510 pivotally attached to axles 1532 on a frame 1526. Leg insert tubes 1512 are joined by a brace 1514 and are telescopically inserted into the leg tubes 1510. A spring loaded detent button 1516 projects into selected detent holes 1516 in the leg tubes 1510, to allow the height of the table 1501 to be adjusted. With the leg insert tubes 1512 inserted fully into the leg tubes 1510, the table 1501 has a minimum height, and the leg assembly 1508 is short enough to allow the sections 1502 and 1504 to fold adjacent and parallel to each other, for compact storage or transport of the table 1501. A latch hinge 1520 is pivotally attached to the frame 1526 and to each leg tube 1510 to latch or hold the leg assemblies 1508 in the extended position shown in FIG. 1. A strap handle 1522 may optionally be provided on either section 1502 or 1504 to allow the folded table 1501 to be more easily carried. Otherwise, the sections 1502 and 1504 may be substantially the same.

Figure 3:
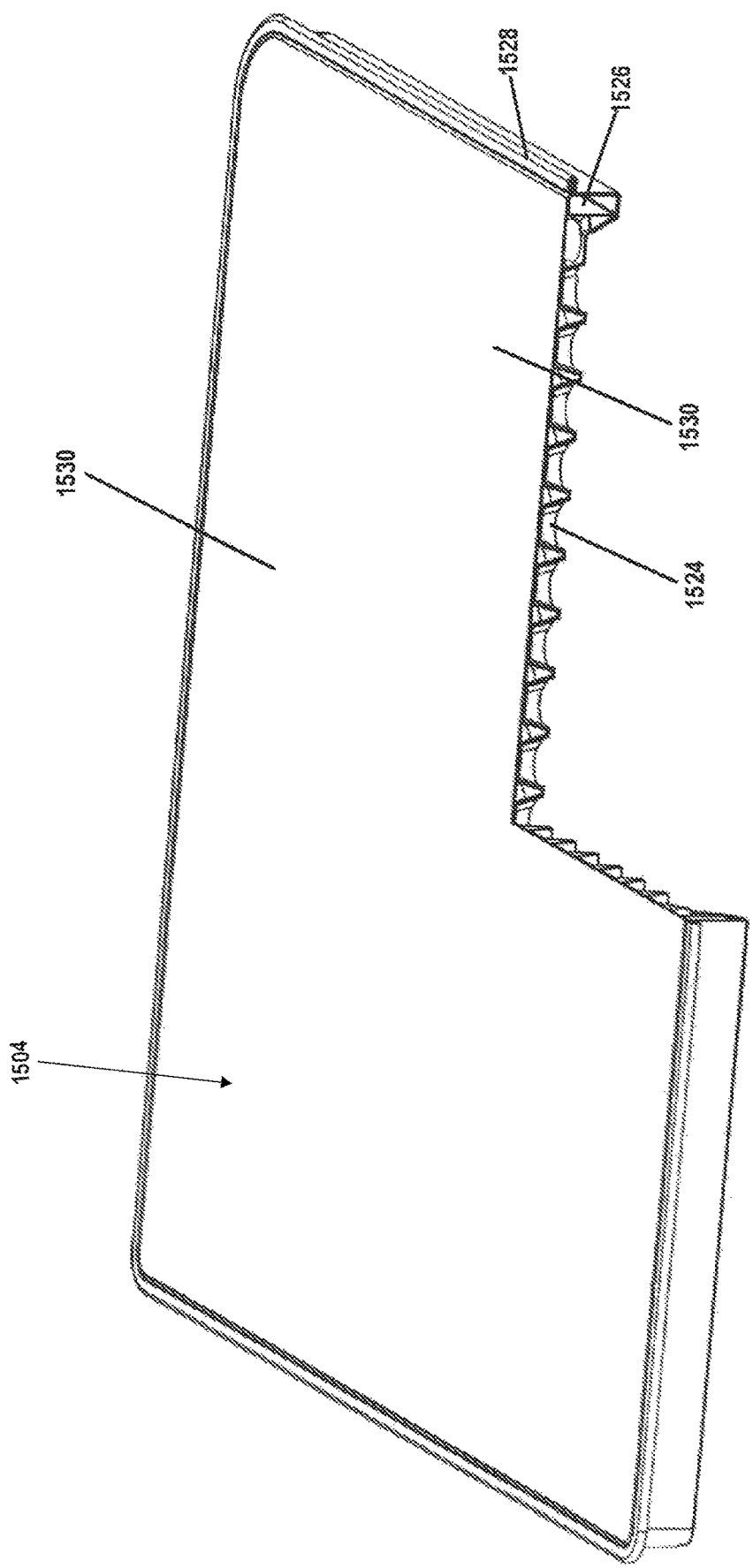
FIG. 3 is a perspective view of the top of the table of FIG. 1 partially cutaway for purpose of illustration.
Figure 5:
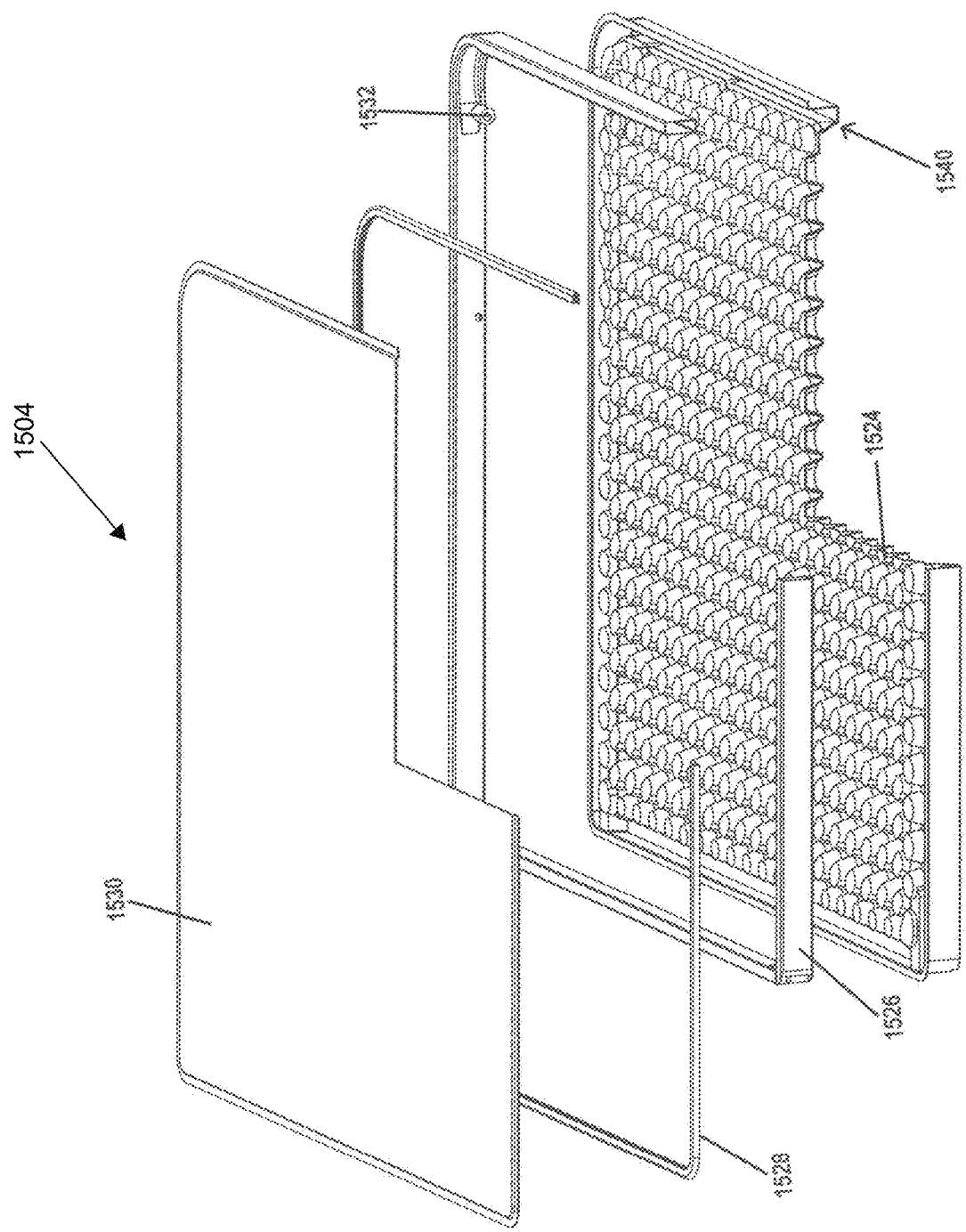
FIG. 5 is an exploded perspective view of the table top shown in FIG. 3.

Turning to FIGS. 3 and 5, the top of the table 1501 includes a bottom plate 1524, a frame 1526, an edge piece 1528 and a top or face plate 1530. The bottom plate 1524, the top plate 1530, the hinges 1506, the frame 1526, reinforcement tubes or plates and other features of the table 1501 may be the same or similar to the tables described in U.S. Pat. No. 10,206,497, incorporated herein by reference. The bottom plate may be vacuum formed plastic, optionally having a pattern of projections, and a top surface of substantially each projection in contact with a lower surface of the top plate, as described in U.S. Pat. No. 10,206,497.

The frame 1526 may be a metal rectangular tube and may be generally continuous around the perimeter of the top of the table. The frame may be bent at the corners of table, with a single seam or discontinuity where the opposite ends of the frame come together. The top plate 1530 may be metal, such as aluminum, or it may be other materials such as plastic.

Figure 4:
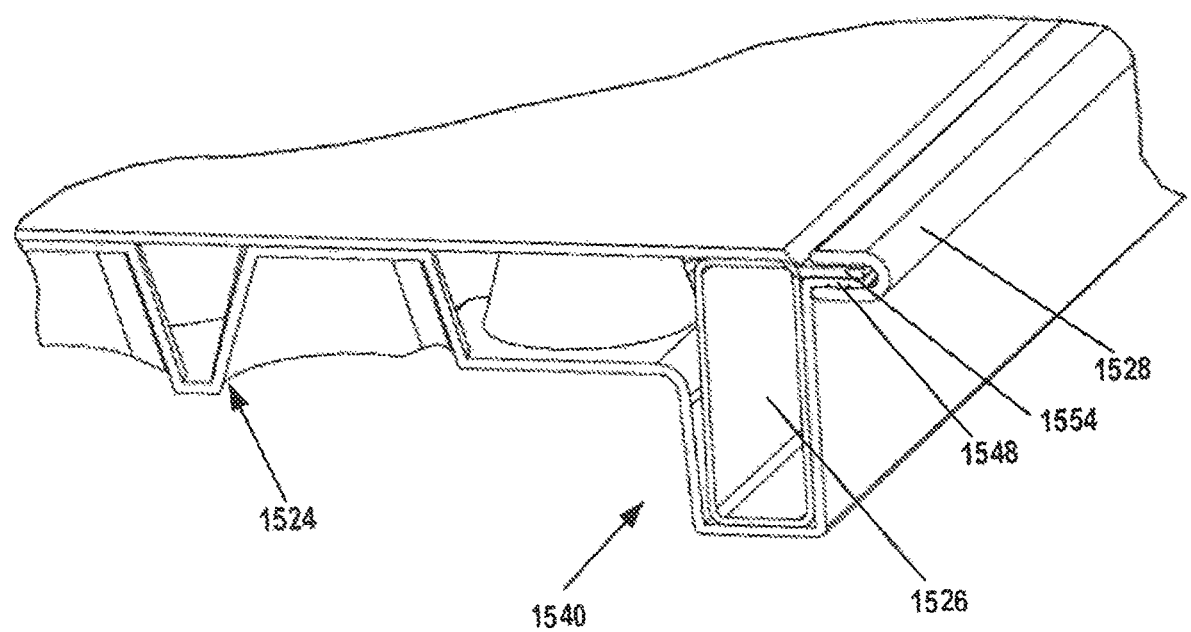
FIG. 4 is an enlarged detail view of the cutaway section shown in FIG. 3.

As shown in FIGS. 4 and 6-9, the bottom plate 1524 has a channel 1540 around its perimeter. The channel 1540 may optionally have a step 1542. The step 1542 has a vertical surface extending up from, and perpendicularly joined into, a flat perimeter bottom surface 1558 of the bottom plate 1524. A vertical surface 1544 extends up from the step 1542 to an interior bottom surface 1570 of the bottom plate 1524. A gap 1556 having a height HH is formed between the interior bottom surface 1570 and the bottom surface of the top plate 1530. As shown in FIG. 4, the projections on the bottom plate 1524 project up across the gap 1556 to support the top plate 1530. The frame 1526 rests on step 1542, with the perimeter bottom surface 1558 spaced apart from the frame 1526 by a bottom gap 1572 formed between the step 1542 and the outer wall 1546 of the bottom plate 1524. In the embodiment shown in FIGS. 1-5, only the channels 1540 on the long sides of the table have a step 1542. The step 1542 may be used to increase the height and the bending moment of inertia of the channel 1540 on the long sides. The increased height of the step 1542 may also provide space for accommodating the folding legs.

In an alternative design shown in FIG. 4 and in dotted lines in FIG. 8, there is no step in the channel 1540. Rather, the channel is simply rectangular to accommodate the rectangular frame 1526, and the entire bottom surface of the frame 1526 sits flat on bottom of the channel 1558. The table 1501 may also be designed with the step 1542 along its left and right sides, and without the step 1542 at its front and rear sides.

A joggle 1550 is provided around the perimeter of the top plate 1530, with the joggle having an angled section 1552 joined to a top plate lip 1554, at an acute angle. A bottom plate lip 1548 joined perpendicularly to the outer wall 1546 is in contact with and parallel to the top plate lip 1554. As shown in FIGS. 7 and 8 the edge piece 1528 has a first or lower arm 1560 joined to a second or upper arm 1562 through a radius 1564. The edge piece 1528, which may be metal, such as aluminum, or other ductile material, is generally U-shaped or V-shaped. Ridges or projections 1566 may be provided on the inner surfaces of the arms 1560 and 1562. The edge piece 1528 may have a length sufficient to extend around the entire perimeter of the top of the table. In this case the edge piece bends smoothly and tightly around the corners of the table top. This embodiment provides an aesthetic appearance, avoids creating sharp edges or discontinuities, and can simplify manufacturing, as well as improving the reliability of the attachment of the edge piece 1528. The first and second arms 1560 and 1562 typically each have a length LL, and the top plate lip 1554 and the bottom plate lip 1548 also each having a length LL, as shown in FIG. 9. The length LL generally is less than the width of the frame 1526.

FIG. 8 shows the assembly of the edge piece 1528 during manufacture of the table 1501. The top plate lip 1554 and the bottom plate lip 1548 may optionally be initially attached to each other via adhesives, welding, fasteners, etc., with the frame 1526 in the channel 1540 and the frame 1526 captive between the top plate 1530 and the bottom plate 1524. Alternatively, the top plate 1530 and the bottom plate 1524 may alternatively be held in a fixture, with or without initially attaching the top plate lip 1554 to the bottom plate lip 1548.

In one embodiment the edge piece is aluminum and is assembled in a cold working process. The edge piece 1528 is shaped to fit the shape of the edge of the table. The edge piece 1528 is bent into an acute angle of 20° to 40°, and typically about 30°. The edge piece 1528 is positioned over or around the top plate lip 1554 and the bottom plate lip 1548. The edge piece 1528 is then pressed or rolled from the original or open position shown in FIGS. 7 and 8, to the closed or crimped position shown in FIG. 9, wherein the edge piece 1528 clamps the top plate lip 1554 to the bottom plate lip 1548. The pressing or clamping is performed sequentially or simultaneously around the entire perimeter of the top of the table. The edge piece 1528 is bent at right angles at the corners of the table sections 1502 and 1504, to allow the edge piece 1528 to extend continuously around the entire table top. The table top comprises the top and bottom plates, the frame and the edge piece. If used, the ridges 1566 project into the top plate lip 1554 and the bottom plate lip 1548 to further secure the edge piece 1528 in place. As shown in FIG. 9, with the table 1501 fully assembled, the top surface of the upper arm 1562 of the edge piece 1528 is co-planer with the top surface of the top plate 1530. With the radius 1564 at the outer edge of the table top, the table 1501 has a smooth continuous perimeter. The edge piece 1528 (and optionally the 1526 frame as well) extends entirely around an upper perimeter area of the top plate, generally shown at 1580 in FIG. 9. In this embodiment no heat is used in forming or attaching the edge piece 1528 and no adhesives are used. This avoids the disadvantages of using adhesives. The edge piece 1528 may also help to close or seal the channel 1540, reducing corrosion of internal components.

The present invention is not to be limited in scope by the specific embodiments described. Changes and modifications may be made to such embodiments without departing from the true scope of the invention. Indeed, various modifications of the invention in addition to those shown and described herein will become apparent to those skilled in the art from the foregoing description and accompanying drawings. Such modifications are intended to fall within the scope of the appended claims. As used here, substantially equal to means within =1-10% of the parameter described.

The invention claimed is:

1. A table comprising:
   a bottom plate having a bottom plate channel and an outer wall;
   a bottom plate lip joined to the outer wall;
   a top plate having a top plate lip overlying and parallel to the bottom plate lip, the top plate lip joined to the top plate via a joggle having an angle section extending downward at an acute angle from the top plate to the top plate lip;
   a frame having a lower end in the bottom plate channel and an upper end in contact with the top plate;
   a ductile edge piece having a first arm joined to a second arm via a radius, the ductile edge piece clamping the top plate lip and the bottom plate lip together, the ductile edge piece extending substantially entirely around a perimeter of the top plate; and
   the bottom plate having a pattern of projections, a top surface of substantially each projection in contact with a lower surface of the top plate.

2. The table of claim 1 wherein the frame comprises a rectangular metal tube.

3. The table of claim 1 with the bottom plate channel having a step with the frame on the step.

4. The table of claim 1 with the top plate lip and the bottom plate lip each have a length LL and the wherein the first arm and the second arm each have a length equal to LL.

5. The table of claim 4 with the frame having a width greater than LL.

6. The table of claim 4 with a bottom gap between a bottom surface of the channel and the frame, with the bottom gap having a width substantially equal to LL.

7. The table of claim 1 with the ductile edge piece having one or more ridges or projections.

8. The table of claim 1 with a top surface of the first arm co-planer with a top surface of the top plate.

9. The table of claim 1 with the bottom plate comprising plastic and the top plate, the frame and the ductile edge piece comprising metal.

10. The table of claim 9 wherein the projections are formed using a vacuum forming process.

11. A table comprising:
- a bottom plate having a pattern of projections, a bottom plate channel and an outer wall;
- a bottom plate lip joined to a top end of the outer wall;
- a top plate lip overlying, parallel to, and contacting the bottom plate lip, the top plate lip joined to a top plate via a joggle having an angle section extending downward at an acute angle from the top plate to the top plate lip;
- a top surface of substantially each projection in contact with a lower surface of the top plate;
- a tubular metal frame, with a lower end of the metal frame in the channel and an upper end of the frame in contact with the top plate, and the outer wall in contact with and parallel to one side of the tubular metal frame;
- an edge piece having a first arm joined to a second arm via a radius, the edge piece clamping the top plate lip and the bottom plate lip together;
- the edge piece and the tubular metal frame extending entirely around an upper perimeter area of the top plate; and
- a leg assembly pivotally attached to the frame.

12. The table of claim 11 with the bottom plate channel having a step with the frame on the step.

13. The table of claim 11 with the top plate lip and the bottom plate lip each having a length LL and wherein the first arm and the second arm each have a length equal to LL.

14. The table of claim 13 with the frame having a width greater than LL.

15. The table of claim 13 with a bottom gap between a bottom surface of the channel and the frame, with the bottom gap having a width substantially equal to LL.

16. The table of claim 11 wherein the edge piece is ductile and has one or more ridges or projections.

17. The table of claim 11 with a top surface of the first arm co-planer with a top surface of the top plate.

18. The table of claim 11 with the bottom plate comprising plastic and the top plate and the edge piece comprising metal.

19. A table comprising:
- a bottom plate having a bottom plate channel and an outer wall;
- a bottom plate lip joined perpendicularly to the outer wall;
- a top plate having a top plate lip overlying and parallel to the bottom plate lip, the top plate lip joined to the top plate via a joggle having an angle section extending downward at an acute angle from the top plate to the top plate lip;
- a frame having a lower end in the bottom plate channel and an upper end of the frame in contact with the top plate;
- the outer wall of the bottom plate in contact with and parallel to one side of the frame;
- the frame on a step in the bottom plate channel;
- a bottom gap between a bottom surface of the bottom plate channel and the frame, and the bottom gap between the step and the outer wall of the bottom plate;
- an edge piece having a first arm joined to a second arm via a radius, the edge piece clamping the top plate lip and the bottom plate lip together, the edge piece extending entirely around a perimeter of the top plate; and
- the bottom plate having a pattern of projections, a top surface of each projection in contact with a lower surface of the top plate.

* * * * *